(12) United States Patent
Sato

(10) Patent No.: US 12,030,110 B2
(45) Date of Patent: Jul. 9, 2024

(54) RIVET JOINING METHOD AND JOINING PROCESSING APPARATUS

(71) Applicant: ULTEX CORPORATION, Fukuoka (JP)

(72) Inventor: Shigeru Sato, Fukuoka (JP)

(73) Assignee: ULTEX CORPORATION, Fukuoka (JP)

( * ) Notice: Subject to any disclaimer, the term of this patent is extended or adjusted under 35 U.S.C. 154(b) by 0 days.

(21) Appl. No.: 17/998,528

(22) PCT Filed: May 14, 2021

(86) PCT No.: PCT/JP2021/018400
§ 371 (c)(1),
(2) Date: Nov. 11, 2022

(87) PCT Pub. No.: WO2021/230350
PCT Pub. Date: Nov. 18, 2021

(65) Prior Publication Data
US 2023/0201910 A1  Jun. 29, 2023

(30) Foreign Application Priority Data
May 14, 2020 (JP) ................. 2020-084936

(51) Int. Cl.
*B21J 15/02* (2006.01)
*B21J 15/16* (2006.01)
(Continued)

(52) U.S. Cl.
CPC ............... *B21J 15/02* (2013.01); *B21J 15/16* (2013.01); *B23K 20/10* (2013.01)

(58) Field of Classification Search
CPC . B21J 15/02; B21J 15/12; B21J 15/16; B23K 20/10
See application file for complete search history.

(56) References Cited

U.S. PATENT DOCUMENTS 6,503,585 B1 * 1/2003 Wagenblast ......... B62D 29/001
108/51.11
10,478,915 B2 * 11/2019 Sato .................... B23K 20/106
(Continued)

FOREIGN PATENT DOCUMENTS

CN          105643090 A  *  6/2016
JP          46-17560 B1     5/1971
(Continued)

OTHER PUBLICATIONS

Zhang et al.; CN105643090A; Ultrasonic metal rivet-welding method for connecting plastic with metal well; Jun. 8, 2016, EPO English Machine Translation; pp. 1-5 (Year: 2016).*
(Continued)

*Primary Examiner* — Bayan Salone
(74) *Attorney, Agent, or Firm* — LUCAS & MERCANTI, LLP

(57) ABSTRACT

A rivet joining method, etc., suitable for providing rivet joining using sound vibration and/or ultrasound vibration is provided. Joining is provided in a state in which a rivet is inserted into a hole formed in a base member. The base member includes a first member and a second member. The hole is formed such that it passes through at least one of the members. The rivet is formed of a metal material and has a head portion and a body portion. A vibration processing part applies sound vibration and/or ultrasound vibration to the rivet in a state in which at least its body portion is inserted into the hole, so as to join the rivet and the inner face of the hole.

12 Claims, 6 Drawing Sheets

(51) Int. Cl.
  *B23K 20/10*   (2006.01)
  *B21J 15/12*   (2006.01)

(56) References Cited

U.S. PATENT DOCUMENTS

2016/0341234 A1* 11/2016 Germann .................. F16B 5/04
2018/0015568 A1*  1/2018 Sato ..................... B23K 20/106

FOREIGN PATENT DOCUMENTS

| | | |
|---|---|---|
| JP | 2017-511443 A | 4/2017 |
| JP | 2018-008288 A | 1/2018 |
| JP | 2021-084118 A | 6/2021 |
| JP | 2021-094594 A | 6/2021 |

OTHER PUBLICATIONS

International Search Report for the corresponding application No. PCT/JP2021/018400 dated Aug. 3, 2021, with English translation.

\* cited by examiner (a)

(b)

(a)

(b)

(c)

(d)

(e)

RIVET JOINING METHOD AND JOINING PROCESSING APPARATUS

CROSS REFERENCE TO RELATED APPLICATION

This Application is a 371 of PCT/JP2021/018400 filed on May 14, 2021, which, in turn, claims priority of Japanese Patent Application No. 2020-084936 filed on May 14, 2020, and the above applications are incorporated herein by reference.

TECHNICAL FIELD

The present invention relates to a rivet joining method and a joining processing apparatus, and particularly to a rivet joining method, etc., for providing a joint by inserting a rivet into a hole formed in a base member.

BACKGROUND ART

As described in Patent document 1, the present applicant has proposed a method for joining multiple members to be joined. Also, as described in Patent documents 2 and 3, the present applicant has proposed various kinds of apparatuses configured to provide joining using sound vibration or ultrasound vibration.

In contrast, with typical swaging methods, after a rivet is inserted into a through hole, the rivet is compressed from both the front side and the back side so as to fix the members to be joined with multiple layers of plates or the like interposed between them.

CITATION LIST

Patent Literature

[Patent Document 1]
  Japanese Patent Application Laid Open No. 2018-008288
[Patent Document 2]
  Japanese Patent Application No. 2019-213334
[Patent Document 3]
  Japanese Patent Application No. 2019-229190

SUMMARY OF INVENTION

Technical Problem

However, with conventional swaging methods, this is not capable of providing such a joint without using such a through hole. Furthermore, in a case in which the members to be joined are formed of aluminum or the like, it is difficult to provide fixation with sufficient strength even if such a through hole is used.

Accordingly, it is a purpose of the present invention to provide a rivet joining method, etc., suitable for providing rivet joining using sound vibration and/or ultrasound vibration.

Solution of Problem

A first aspect of the present invention relates to a rivet joining method for providing joining after a rivet is inserted into a hole formed in a base member. The base member includes multiple members. The hole is formed such that it passes through at least one from among the members. The rivet is formed of a metal material and has a head portion and a body portion. The rivet joining method includes joining processing in which a vibration processing part applies sound vibration and/or ultrasound vibration to the rivet in a state in which at least the body portion is inserted into the hole, so as to join the rivet and the inner face of the hole.

A second aspect of the present invention relates to the rivet joining method according to the first aspect. The hole formed in the base member is configured as a hole that does not pass through the base member. In the joining processing, a pressing part presses the base member, and the vibration processing part applies sound vibration and/or ultrasound vibration to the head portion, so as to join the rivet and the hole.

A third aspect of the present invention relates to the rivet joining method according to the first aspect. The hole formed in the base member is configured as a through hole that passes through the base member. In the joining processing, a pressing part presses one from among the tip of the body portion of the rivet and the head portion of the rivet, and the vibration processing part applies sound vibration and/or ultrasound vibration to the other, so as to join the rivet and the hole.

A fourth aspect of the present invention relates to the rivet joining method according to any one of the first aspect through the third aspect. Joining processing is performed using diffusion of atoms that occurs between the rivet and the hole.

A fifth aspect of the present invention relates to the rivet joining method according to the fourth aspect. A part of or all of the multiple members are formed of a metal material. In the joining processing, at least a part of portions of the members in the vicinity of the hole to which the sound waves can be transmitted are joined.

A sixth aspect of the present invention relates to the rivet joining method according to any one of the first aspect through the fifth aspect. Multiple holes are formed in the base member. In the joining processing, the vibration processing part applies sound vibration and/or ultrasound vibration to each of the multiple rivets inserted into the multiple holes, so as to provide a joint.

A seventh aspect of the present invention relates to the rivet joining method according to the sixth aspect. A part of or all of the multiple members are formed of a metal material. In the joining processing, at least the multiple holes and the members between the multiple holes are joined.

An eighth aspect of the present invention relates to a joining processing apparatus configured to perform joining processing for a rivet inserted into a hole formed in a base member. The base member includes multiple members. The hole is formed such that it passes through at least one from among the members. The rivet is formed of a metal material and has a head portion and a body portion. The joining processing apparatus includes a vibration processing part configured to apply sound vibration and/or ultrasound vibration to the rivet in a state in which at least the body portion is inserted into the hole, so as to join the rivet and the inner face of the hole.

It should be noted that the present invention may also be provided as a program for controlling a computer for controlling a metal joining apparatus configured to provide joining processing using sound vibration and/or ultrasound vibration so as to realize each aspect of the present invention, or a computer-readable recording medium for recording the program.

Advantageous Effects of Invention

From each aspect of the present invention, this allows a rivet and a base member to be joined using sound vibration (vibration that is lower than 20 kHz) and/or ultrasound vibration (vibration that is equal to or higher than 20 kHz).

DESCRIPTION OF EMBODIMENTS

Description will be made below with reference to the drawings regarding examples of the present invention. It should be noted that the embodiments of the present invention are by no means intended to restrict the present invention to the examples described below.

EXAMPLES

Figure 1:
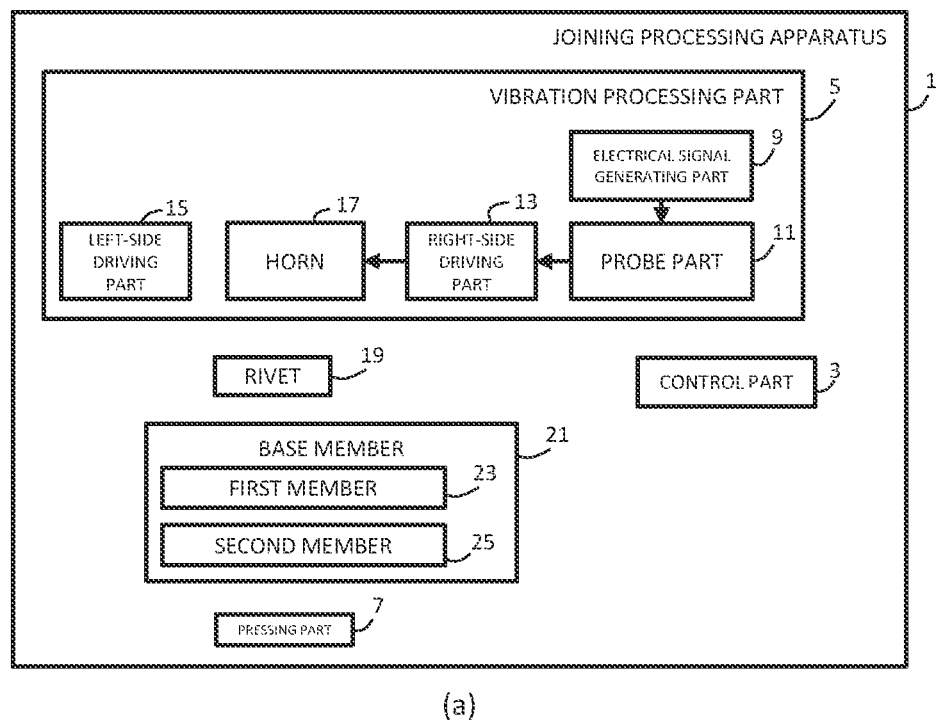
FIG. 1(a) shows a block diagram showing an example configuration of a joining processing apparatus according to an embodiment of the present invention.
FIG. 1(b) shows a flowchart showing an example of joining processing provided by the joining processing apparatus.
Figure 1:
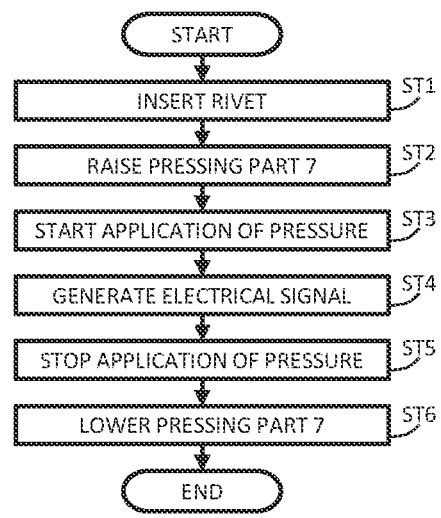

FIG. 1(a) is a block diagram showing an example configuration of a joining processing apparatus according to an embodiment of the present invention. FIG. 1(b) is a flowchart showing an example of joining processing provided by the joining processing apparatus.

Referring to FIG. 1(a), a joining processing apparatus 1 includes a control part 3, a vibration processing part 5 (an example of a "vibration processing part" in the present claims), and a pressing part 7 (an example of a "pressing part" in the present claims). The vibration processing unit 5 includes an electrical signal generation part 9, a probe part 11, a right-side driving part 13, a left-side driving part 15, and a horn 17.

The control part 3 controls the operation of the joining processing apparatus 1 using a control signal.

The vibration processing part 5 joins a rivet 19 and a base member 21 using sound vibration (vibration that is lower than 20 kHz) and/or ultrasound vibration (vibration that is equal to or higher than 20 kHz). The base member 21 includes multiple members. Description will be made with reference to FIGS. 1(a) to 1(b) assuming that the base member 21 includes a first member 23 and a second member 25. The rivet 19 is formed of a metal material, examples of which include copper, aluminum, iron (steel), etc. The first member 23 and the second member 25 may each be formed of a metal material (e.g., aluminum, iron (steel), etc.). Also, the first member 23 and the second member 25 may each be formed of an inorganic material (e.g., ceramic, etc.). For example, an arrangement may be made in which the first member 23 is formed of a metal material and the second member 25 is formed of an inorganic material.

The first member 23 and the second member 25 are each structured as a plate-shaped member. One or multiple holes are formed from the front face of the base member 21. Each hole is structured as a hole that passes through at least the first member 23. Also, each hole may not be formed in the second member 25 (see FIG. 5(a) or the like). Also, each hole may be formed such that it passes through a part of the second member 25 from the front face thereof (see FIG. 5(c) or the like). Also, each hole may be formed as a hole that passes through the second member 25 (through hole formed in the base member 21, see FIG. 6(a) or the like). The inner face of each hole is, for example, a part that is not the surface of the base member 21.

The rivet 19 includes a body portion and a head portion. The end of the body portion that is opposite to the head portion will be referred to as a "tip". The tip is formed with a size that is at least smaller than the shape of the hole in the surface of the base member 21. However, at a portion that is at a deeper location in the hole, the tip may be formed so as to be larger than the hole (see FIG. 5(d) or the like, for example). Vibration is applied in a state in which at least a part of the head portion is not inserted into the hole.

In the vibration processing part 5, the electrical signal generating part 9 oscillates an electrical signal that corresponds to the sound vibration and/or ultrasound vibration. The probe part 11 converts the electrical signal into mechanical vibration. The right-side driving part 13 and the left-side driving part 15 rotate the horn 17 in a state in which the horn 17 is supported by them. The right-side driving part 13 transmits mechanism vibration generated by the probe part 11 to the horn 17. The horn 17 is resonated at a position above the rivet 19 and the base member 21. With this, the vibration processing part 5 is capable of providing joining processing using sound vibration and/or ultrasound vibration.

The pressing part 7 can be moved upward and downward at a position below the rivet 19 and the base member 21. Furthermore, the pressing part 7 is capable of feeding the base member 21 or the like according to the rotation of the horn 17 as necessary. By moving the pressing part 7 upward, this provides a state in which the rivet 19 and the base member 21 are interposed between the horn 17 and the pressing part 7. In the state in which the rivet 19 and the base member 21 are interposed between the horn 17 and the pressing part 7, the pressing part 7 is able to press the rivet 19 and the base member 21. By moving the pressing part 7 downward, this provides a state in which it is away from the rivet 19 and the base member 21.

FIG. 1(b) is a flowchart showing an example of joining processing provided by the joining processing apparatus 1. The rivet 19 is inserted into the hole of the base member 21 (Step ST1). The control part 3 raises the pressing part 7 (Step ST2). The control part 3 starts to apply pressure from the pressing part 7 to the horn 17 (Step ST3).

The control part 3 instructs the vibration processing part 5 to perform joining processing using sound vibration and/or ultrasound vibration (Step ST4). The control part 3 instructs the pressing part 7 to stop the application of pressure to the horn 17 (Step ST5). The control part 3 lowers the pressing part 7 (Step ST6).

Figure 2:
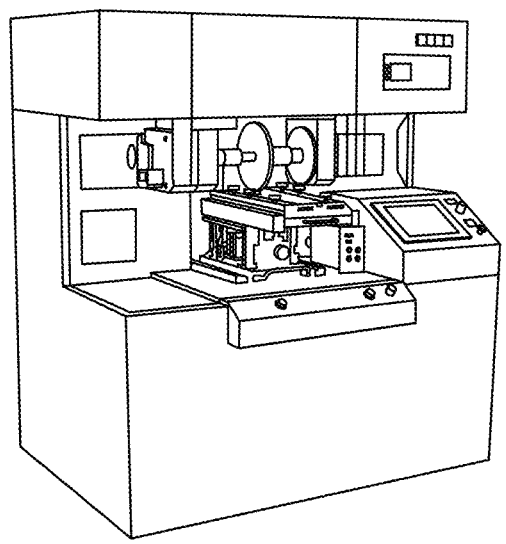
FIGS. 2(a) to 2(e) show a diagram for explaining an example of an actual apparatus of the joining processing apparatus 1 shown in FIG. 1(a).
Figure 2:
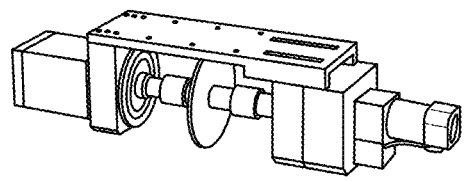
Figure 2:
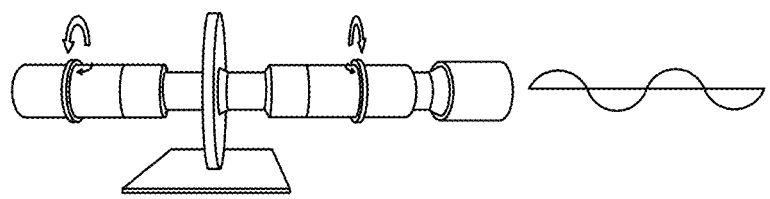
Figure 2:
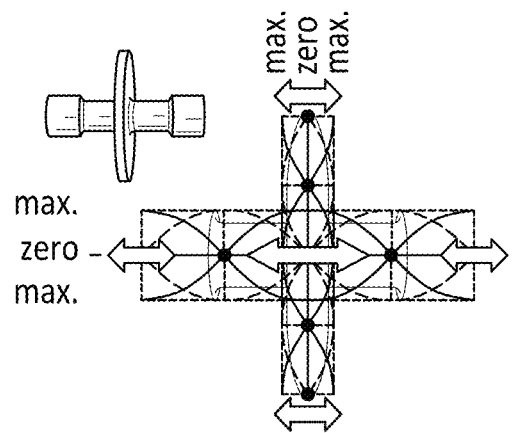
Figure 2:
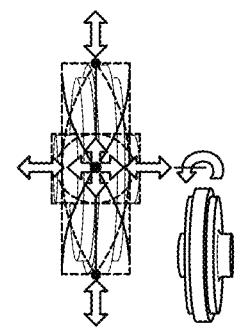

FIGS. 2(a) to 2(e) illustrate an example of an actual apparatus of the joining processing apparatus 1 shown in FIG. 1(a). FIG. 2(a) shows the overall configuration of the actual apparatus. FIG. 2(b) shows a part of an actuator shown in FIG. 2(a).

FIG. 2(c) is a schematic diagram showing a sound-wave rotary system. The horn is vibrated in a transverse (horizontal) vibration mode or a longitudinal (vertical) vibration mode so as to transmit sound-wave energy to a part, thereby providing joining processing using a metal material.

FIGS. 2(d) and 2(e) are diagrams for explaining the transverse vibration and the longitudinal vibration, respectively. The vibration mode of the horn changes according to the shape of the horn. The vibration mode is classified into the transverse vibration mode and the longitudinal vibration mode, for example. In the transverse vibration mode, with one wavelength as a base, and with the maximum vibration amplitude point, i.e., the center of the horn, as the center of vibration, the vibration is transmitted as transverse vibration in which the vibrations are parallel in the horizontal direction. In the longitudinal vibration mode, with a half wavelength as a base, and with the maximum stress point, i.e., the center of the horn, as the center of vibration, the vibration amplitude bifurcates into vibrations in the radial longitudinal directions.

Next, specific description will be made with reference to experiments performed by the present applicant. In the experiments, aluminum materials were used. Specifically, A1050, A2017, and A7075 were used as pure aluminum, duralumin, and extra super duralumin, respectively.

FIGS. 3(a) to 3(g) and 4(a) to 4(e) show the experimental results of a completely sealed joint of a three-dimensional metal structure (see Patent document 1), which is a unique technique proposed by the present applicant. FIGS. 3(a) to 3(g) and 4(a) to 4(e) show vibration in a direction that is parallel to the pressure-applying direction (longitudinal vibration) and vibration in a direction that is orthogonal to the pressure-applying direction (transverse vibration), respectively. The experimental results pass the underwater sealing test.

Figure 3:
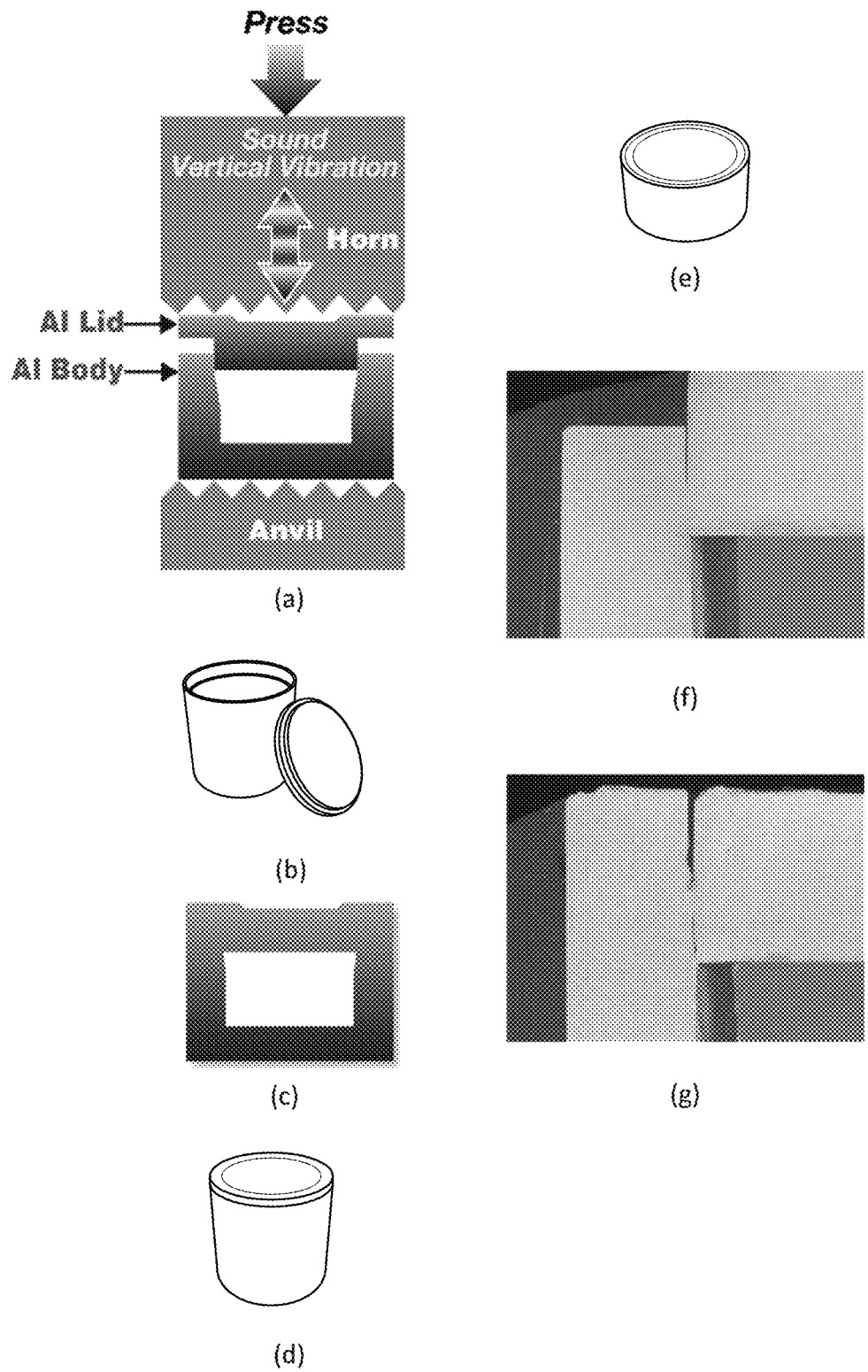
FIGS. 3(a) to 3(g) show a first diagram showing experimental results of complete sealing joining of a three-dimensional structure.

Description will be made with reference to FIG. 3(a) to 3(g) regarding a case of longitudinal vibration. FIGS. 3(a) and 3(b) each show a state before the joining processing. FIGS. 3(c) and 3(d) each show a state after the joining processing. In this example, a round casing was subjected to the joining processing. The dimensions of the lid are od=54 mm and t=6 mm, and the dimensions of the body are od=54 mm, id=48 mm, h=50 mm, and t=3 mm.

FIGS. 3(e), 3(f), and 3(g) each show an example of sealing joining of a three-dimensional metal structure formed of aluminum members each having a diameter of 150 mm. FIGS. 3(f) and 3(g) shows a case in which the joint portion was not damaged and a case in which the joint portion was damaged, respectively. No trace of fusion was observed in any of the experimental results. That is to say, an ingot is formed by the diffusion joining. Diffusion joining provides such joining using the diffusion of atoms that occurs at the joining surface. For example, the base member is heated and pressed without melting in a state in which it is held. With this, the atoms at the joining interface are diffused across the joining surface, thereby providing a perfect joint portion from the metallurgical viewpoint.

Figure 4:
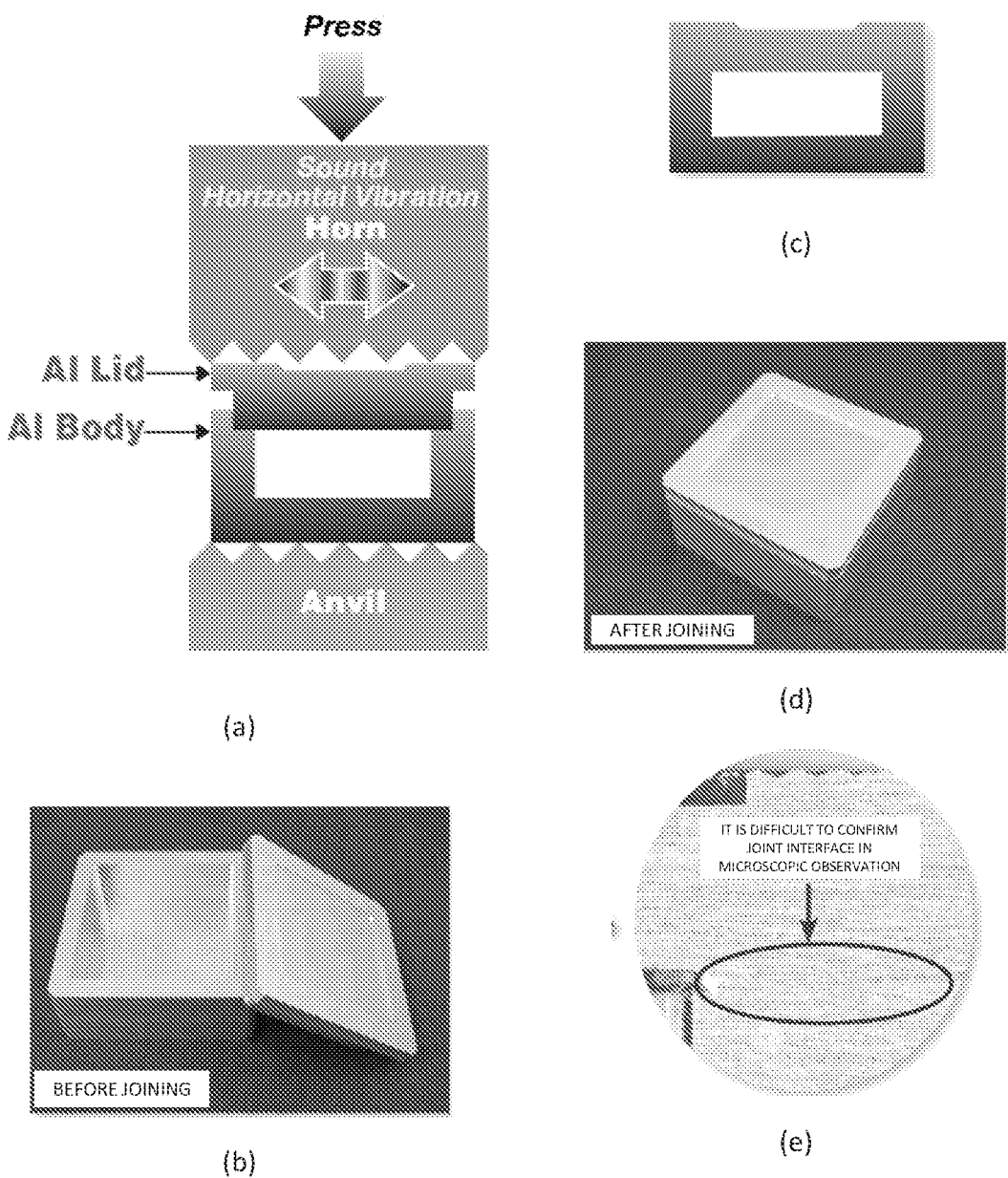
FIGS. 4(a) to 4(e) show a second diagram showing experimental results of complete sealing joining of a three-dimensional structure.

Description will be made with reference to FIGS. 4(a) to 4(e) regarding a case of transverse vibration. FIGS. 4(a) and 4(b) each show a state before the joining processing. FIGS. 4(c) and 4(d) each show a state after the joining processing. In this example, a rectangular casing was subjected to the joining processing. The lid is formed of A6063S-T5 50 with t32 12 mm, and the body is formed of ADC12 50 with h=20 mm.

FIG. 4(e) is a microscopic photograph of the cross section. In the microscopic observation, it is difficult to confirm the joining interface because an ingot is formed by the diffusion joining.

FIGS. 5(a) to 5(e) and 6(a) to 6(f) each show an example of joining processing according to the present invention.

Figure 5:
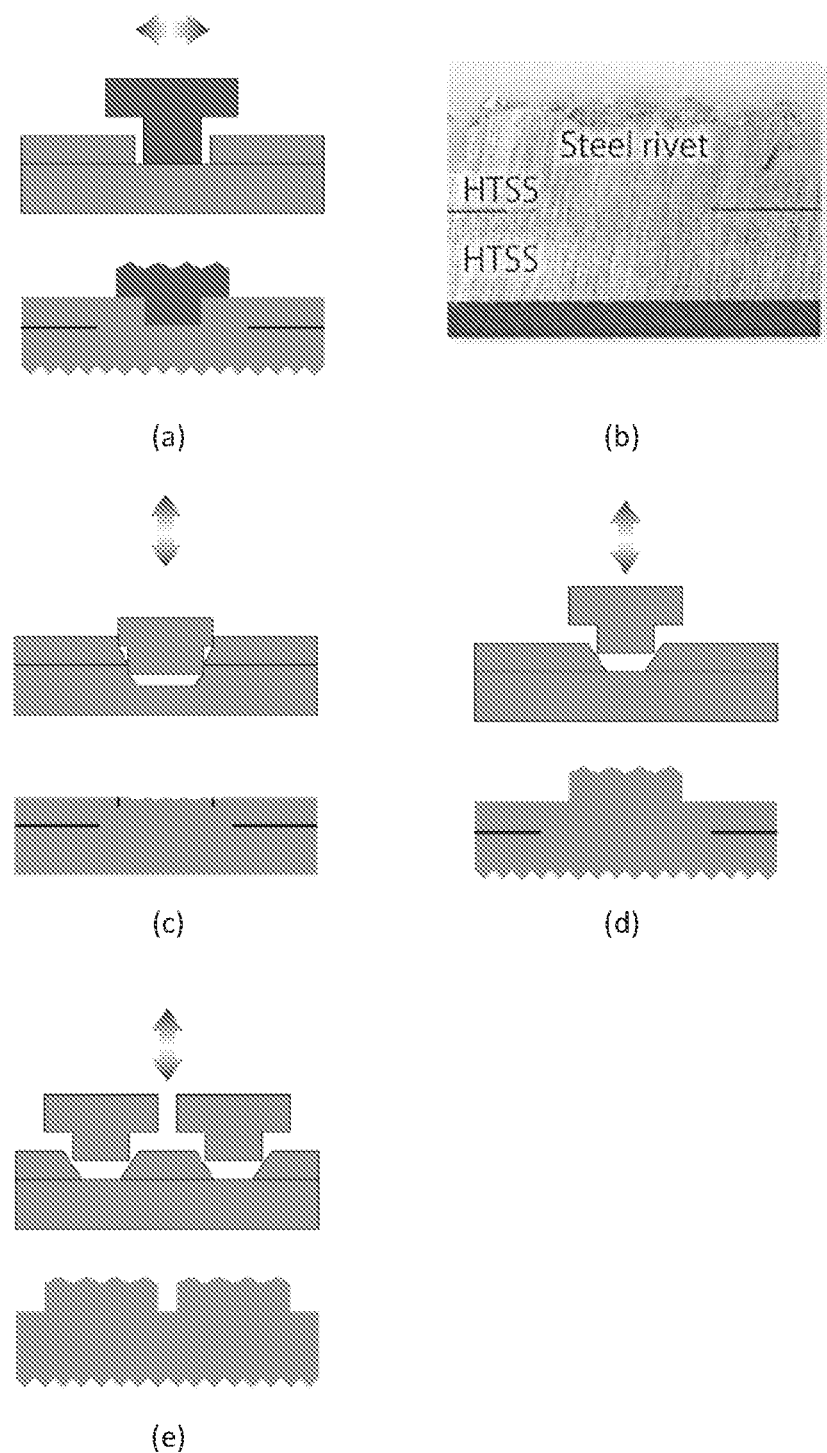
FIGS. 5(a) to 5(e) show a first diagram showing an example of the joining processing according to the present invention.

FIG. 5(a) shows an example of joining processing using transverse vibration. The base member is configured as a pair of plate-shaped members stacked in the vertical direction. A through hole is formed in the upper-side plate-shaped member, and there is no hole in the lower-side plate-shaped member. Pressure is applied from the lower side to the lower-side plate-shaped member. In this state, transverse vibration is applied to the head portion of the rivet inserted into the hole so as to provide joining processing. FIG. 5(b) shows microscopic observation of the cross section subjected to the joining processing. In this example, the two plate-shaped members are each formed of HTSS (High Tensile Strength Steel). The rivet is formed of iron (steel). In the same manner as shown in FIGS. 3(a) to 3(g) and 4(a) to 4(e), an ingot is formed by the diffusion joining.

FIGS. 5(c), 5(d), and 5(e) each show an example of joining processing using transverse vibration. In this case, for example, the hole has a shape such that, at the surface, the hole size is larger than the tip of the rivet, such that the hole size becomes smaller according to the depth of the hole, and such that, at the deepest position, the hole size is smaller than the tip of the rivet. In this case, such an arrangement provides a state in which the tip of the rivet is in contact with the side face of the inner side of the hole when the tip of the rivet is inserted into the hole. The base member has a structure formed of a pair of the plate-shaped members stacked in the vertical direction.

FIG. 5(c) shows an example in which a hole is formed such that it passes through the upper-side plate-shaped member, and such that it passes through a part of the lower-side plate-shaped member from its front face. With such a structure, this is capable of preventing the occurrence of protrusion due to the rivet positioned on the surface of the base member after joining.

FIG. 5(d) shows an example in which a hole is formed such that it passes through the upper-side plate-shaped member, and such that there is no hole in the lower-side plate-shaped member. As shown in FIG. 5(d), this provides joining processing using longitudinal vibration in the same manner as shown in FIG. 5(a).

FIG. 5(e) shows an example in which multiple holes are formed. Each hole is formed such that it passes through the upper-side plate-shaped member, and such that there is no hole in the lower-side plate-shaped member. In the same manner as shown in FIG. 5(d), longitudinal vibration is applied to multiple rivets inserted into the multiple holes so as to provide joining processing. For example, in a case of performing plastic welding, welding is performed by melting a plastic portion. Accordingly, plastic welding is performed using the melted burrs that occur due to welding and that spread like an adhesive agent with the welded portion as a start point. With the present invention, this is capable of providing diffusion joining over a wide range to which sound waves are transmitted, even outside a portion where energy is concentrated. With the present invention, this is capable of providing diffusion joining to a portion interposed between members in addition to a portion interposed between a rivet and a base member. Accordingly, such an arrangement is capable of providing joining processing with rivets each inserted into the corresponding hole. In addition, such an arrangement is capable of providing joining processing between the members via multiple holes, thereby providing sealing joining.

FIGS. 6(a) to 6(f) an example of joining processing using through holes formed in the base member. In this example, the base member is formed as a pair of plate-shaped members stacked in the vertical direction, and has through holes.

Figure 6:
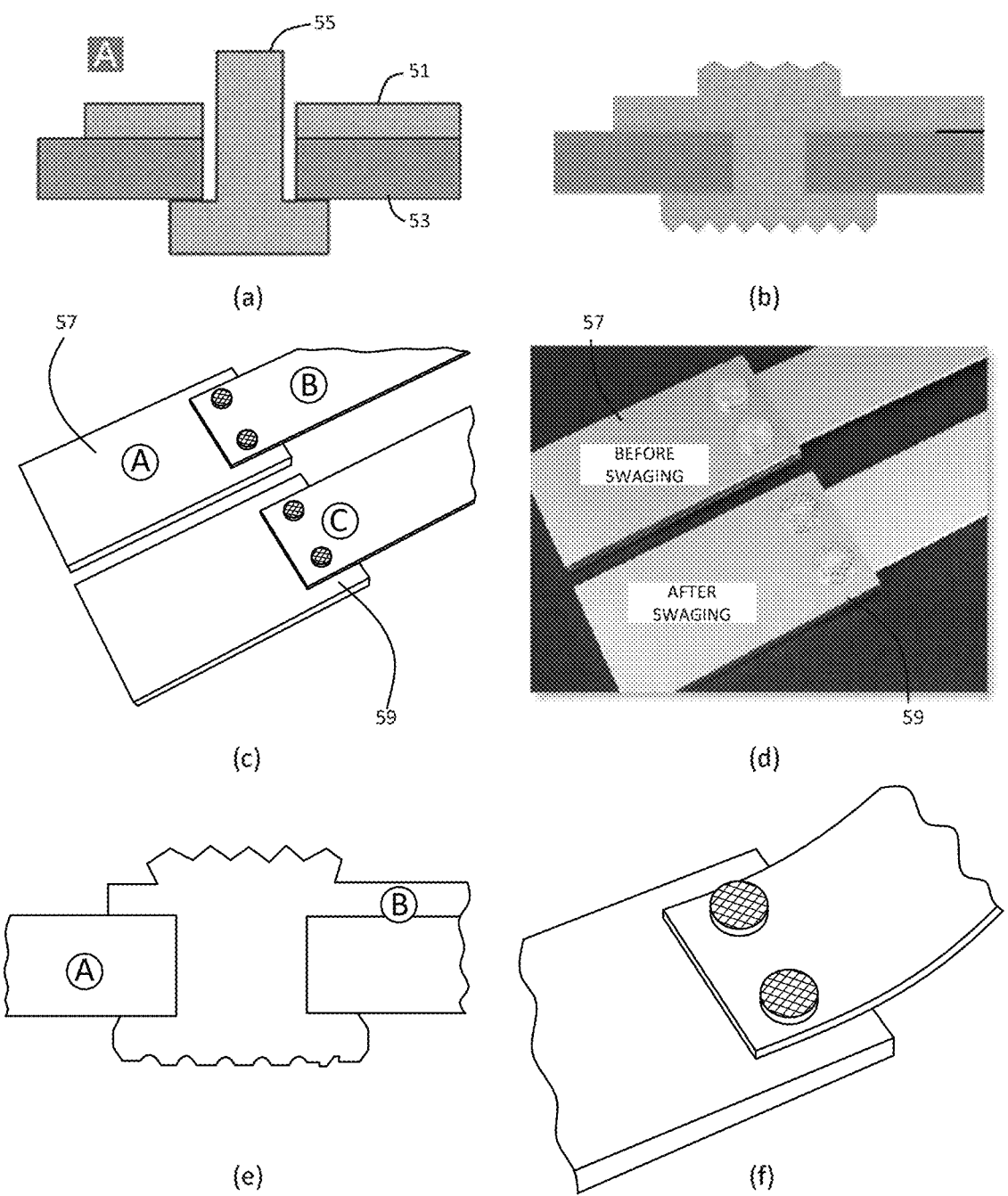
FIGS. 6(a) to 6(f) show a second diagram showing an example of the joining processing according to the present invention.

FIGS. 6(a) and 6(b) are diagrams showing an example before joining processing and an example after joining processing. In this example, the upper-side plate-shaped member 51, the lower-side plate-shaped member 53, and the rivet 55 are each formed of a metal material. The rivet 55 is inserted into the hole from the lower side. Pressure is applied to the head portion of the rivet 55 from the lower side. In this state, sound vibration and/or ultrasound vibration is applied from the upper side to the tip of the body portion of the rivet 55. As shown in FIG. 6(b), this provides diffusion joining such that no joint portion can be observed between the rivet 55 and the plate-shaped member 51. This also provides diffusion joining between the plate-shaped member 51 and the plate-shaped member 53 over a region to which the sound vibration and/or ultrasound vibration can be transmitted (e.g., in the vicinity of the hole or the like).

FIGS. 6(c) and 6(f) each show an example of actual processing. In the drawings, a target 57 before joining processing and a target 59 after joining processing are shown. FIGS. 6(c) and 6(d) show the target 57 and the target 59 as viewed from the front side and the back side, respectively. Here, "A" indicates aluminum 5052 (t=3 mm), "B" indicates aluminum 1050 (t=1 mm), and "C" indicates a 1000-type aluminum rivet.

FIG. 6(e) shows microscopic observation of the cross section. An ingot is formed by the diffusion joining. FIG. 6(f) shows a bending experiment. As described above, such an arrangement is capable of providing simultaneous multi-point joining processing so as to form an aluminum rivet ingot joint. This provides aluminum swaging fixation without involving loosening of the joint. Furthermore, such an arrangement requires only sound energy without conversion. Furthermore, such an arrangement provides ingot joining processing at room temperature in the atmosphere. Moreover, such an arrangement requires a joining processing time of approximately 3 to 5 seconds. In addition, almost no heat generation was observed in the sound-wave tool and anvil.

With typical swaging methods, after a rivet is inserted into a through hole, the rivet is pressed from both sides, i.e., from the front side and the back side, so as to fix multiple layers of plates or the like such that they are held by the rivet. Such joining processing cannot be provided without using a through hole as shown in FIG. 5(a) to 5(e). Furthermore, it is difficult for such a typical swaging method to provide fixation such as shown in FIG. 6(a) to 6(f) even in a case in which such a through hole is employed.

With the present invention, this provides the following functions described below, for example. Instead of forming a pressure-bonded joint portion, this allows the entire region of the joint portion to be formed as a single body in the form of an ingot or alloy. Such an arrangement is capable of providing joining strength that is higher than that provided by swaging without change over time. In order to provide joining processing, such an arrangement is capable of using both longitudinal vibration and transverse vibration. For example, by using transverse vibration, this supports fixation of a brittle material such as ceramic or the like. Furthermore, this is capable of providing simultaneous joining processing for multiple portions. For example, by providing fixation with multiple rivets with a narrow pitch between them, this is capable of providing linear hermetic sealing joining for a three-dimensional (3D) structure. This is capable of providing a planar joint without protrusion (roughness) due to the rivets. In a case of providing joining processing on a rigid plate, such an arrangement requires no receiving jig. By making a combination of basic types, this allows various kinds of designs to be made.

It should be noted that the sound vibration and/or the ultrasound vibration can be provided by an apparatus described in Patent documents 2 and 3, for example.

REFERENCE SIGNS LIST 1 joining processing apparatus, 3 control part, 5 vibration processing part, 7 pressing part, 9 electrical signal generation part, 11 probe part, 13 right-side driving part, 15 left-side driving part, 17 horn, 19 rivet, 21 base member, 23 first member, 25 second member.

The invention claimed is:

1. A rivet joining method for providing joining after a rivet is inserted into a hole formed in a base member, wherein the base member comprises a plurality of members,
    wherein the hole is formed such that it passes through at least one from among the members and the hole has a metal side wall,
    wherein the rivet is formed of a metal material and has a head portion and a body portion,
    wherein the rivet joining method comprises joining processing in which a vibration processing part applies sound vibration and/or ultrasound vibration to the rivet in a state in which at least the body portion is inserted into the hole, so as to join the rivet and the metal side wall of the hole, and
    wherein the joining processing is performed using diffusion of atoms that occurs between the rivet and the hole.

2. The rivet joining method according to claim 1, wherein the hole formed in the base member is configured as a hole that does not pass through the base member,
    and wherein, in the joining processing, a pressing part presses the base member, and the vibration processing part applies sound vibration and/or ultrasound vibration to the head portion, so as to join the rivet and the hole.

3. The rivet joining method according to claim 1, wherein the hole formed in the base member is configured as a through hole that passes through the base member,
    and wherein, in the joining processing, a pressing part presses one from among a tip of the body portion of the rivet and the head portion of the rivet, and the vibration processing part applies sound vibration and/or ultrasound vibration to the other, so as to join the rivet and the hole.

4. The rivet joining method according to claim 1, wherein a part of or all of the plurality of members are formed of a metal material,
    and wherein, in the joining processing, at least a part of portions of the members in the vicinity of the hole to which the sound waves can be transmitted are joined.

5. The rivet joining method according to claim 1, wherein a plurality of holes are formed in the base member,
    and wherein, in the joining processing, the vibration processing part applies sound vibration and/or ultrasound vibration to each of a plurality of rivets inserted into the plurality of holes, so as to provide a joint.

6. The rivet joining method according to claim 5, wherein a part of or all of the plurality of members are formed of a metal material,
    and wherein, in the joining processing, at least the plurality of holes and the members between the plurality of holes are joined.

7. A joining processing apparatus configured to perform joining processing for a rivet inserted into a hole formed in a base member, wherein the base member comprises a plurality of members, wherein the hole is formed such that it passes through at least one from among the members and the hole has a metal side wall, wherein the rivet is formed of a metal material and has a head portion and a body portion, wherein the joining processing apparatus comprises a vibration processing part configured to apply sound vibration and/or ultrasound vibration to the rivet in a state in which at least the body portion is inserted into the hole, so as to join the rivet and the metal side wall of the hole, and wherein the vibration processing part performs joining processing using diffusion of atoms that occurs between the rivet and the hole.

8. The rivet joining apparatus according to claim 7, wherein the hole formed in the base member is configured as a hole that does not pass through the base member, and wherein a pressing part presses the base member, and the vibration processing part applies sound vibration and/or ultrasound vibration to the head portion, so as to join the rivet and the hole.

9. The rivet joining apparatus according to claim 7, wherein the hole formed in the base member is configured as a through hole that passes through the base member, and wherein a pressing part presses one from among a tip of the body portion of the rivet and the head portion of the rivet, and the vibration processing part applies sound vibration and/or ultrasound vibration to the other, so as to join the rivet and the hole.

10. The rivet joining apparatus according to claim 7, wherein a part of or all of the plurality of members are formed of a metal material, and wherein at least a part of portions of the members in the vicinity of the hole to which the sound waves can be transmitted are joined.

11. The rivet joining apparatus according to claim 7, wherein a plurality of holes are formed in the base member, and wherein the vibration processing part applies sound vibration and/or ultrasound vibration to each of a plurality of rivets inserted into the plurality of holes, so as to provide a joint.

12. The rivet joining apparatus according to claim 11, wherein a part of or all of the plurality of members are formed of a metal material, and wherein at least the plurality of holes and the members between the plurality of holes are joined.

* * * * *